Patented Apr. 11, 1950

2,504,016

UNITED STATES PATENT OFFICE 2,504,016

CYCLOOCTADIENES AND THEIR PREPARATION

Robert E. Foster, Wilmington, Del., assignor to E. I. du Pont de Nemours & Company, Wilmington, Del., a corporation of Delaware No Drawing. Application March 14, 1947, Serial No. 734,869

9 Claims. (Cl. 260—666)

This invention relates to a process for the cyclo-1,4-dimerization of aliphatic conjugated dienes and to the preparation of dimers which are eight-membered carbocyclic unsaturated compounds.

It is known that 2-chloro-1,3-butadiene dimerizes when it is heated in the presence of polymerization inhibitors and that six-membered carbocyclic compounds are obtained when 2-methyl-1,3-butadiene and 1,3-butadiene dimerize. (J. Am. Chem. Soc. 53, 4211 (1931)). A very small amount of 1,5-dichloro-1,5-cyclooctadiene has been isolated by Brown, Rose, and Simonsen (J. Chem. Soc. 101 (1944)) from still residues from the distillation of 2-chloro-1,3-butadiene.

It is an object of this invention to provide a new process for the dimerization of aliphatic conjugated dienes to eight-membered carbocyclic unsaturated compounds. A further object is to provide an improved process for the dimerization of butadienes and halogenated butadienes to eight-membered carbocyclic unsaturated compounds. A still further object is to provide eight-membered carbocyclic unsaturated compounds from chlorinated butadienes. Other objects will appear hereinafter.

These objects are accomplished by the following invention which comprises dimerization of the aliphatic conjugated diene at a temperature of at least 30° C., in the presence of a polymerization inhibitor and a catalyst. It has now been discovered that dimerization of aliphatic conjugated dienes, such as 1,3-butadiene and halogenated 1,3-butadienes, are directed to the formation of eight-membered carbocyclic unsaturated compounds by carrying on the dimerization at a temperature of 30° to 140° C. in the presence of a polymerization inhibitor and a catalyst. 1,3-butadienes are dimerized to cyclooctadienes by the process of this invention. Dimerization of 2,3-dichloro-1,3-butadiene by the process of this invention produces an eight-membered carbocyclic unsaturated compound, tetrachloro-cyclooctadiene.

As catalysts for bringing about the dimerization there can be used in this invention nickel cyanide and nickel coordination compounds, such as nickel ethyl acetoacetate, and the like, calcium oxide, barium oxide, magnesium oxide, cuprous chloride, activated carbon, barium fluoride, and calcium carbonate. However, nickel cyanide and activated carbon are preferred catalysts for use in this invention. The amount of catalyst can range from 2 to 30% on the weight of the conjugated diene in the charge. Most generally, however, from 5 to 25% is employed.

In the practice of this invention, there can be used as polymerization inhibitors such materials as mononuclear and polynuclear, monohydric and polyhydric phenols, and as examples of such may be mentioned: phenol, catechol, resorcinol, hydroquinone, tertiary amylphenol, p-tert.-butylcatechol, phloroglucinol, pyrogallol, naphthols and the like; amines, such as aniline, para-N-diethylamino aniline, naphthylamines, triethylamine, phenothiazine, and the like; aromatic polynitro compounds such as picric acid, trinitrotoluene, and the like; and terpenes such as alpha-pinene and the like. Phenothiazine and p-tert.-butylcatechol are particularly preferred as polymerization inhibitors for use in this invention. The amount of inhibitor may range up to 10% on the weight of the dienes, but is usually in the range of 0.2% to 5%.

The conjugated dienes employed in the practice of this invention are the aliphatic dienes in which the unsaturation is conjugated and, as examples, may be mentioned 1,3-butadiene, 2-methyl-1,3-butadiene, 2,3 - dimethyl - 1,3 - butadiene, 2-chloro-1,3-butadiene, 2,3-dichloro-1,3-butadiene, and the like. Of these, the preferred diene is 1,3-butadiene because of cost, importance of cyclic diene, and the smoothness with which it is converted to an eight-membered carbocyclic compound under relatively mild temperature conditions, that is, 80° to 120° C. by the process of the present invention. However, the chlorinated 1,3-butadienes, such as 2,3-dichloro-1,3-butadiene, are also particularly suitable for dimerization by the process of this invention.

In general, satisfactory yields of the eight-membered carbocyclic unsaturated compound are obtained at temperatures of 30° to 140° C. when the process is carried out as a batch operation. For best results, however, temperatures in the range of 80° to 120° C. are employed. In the case of continuous vapor phase operation, temperatures in excess of 140° C. and up to the decomposition temperature of the diene can be used.

Satisfactory results are usually obtained by conducting the reaction under autogenous pressure and, because this simplifies the equipment requirements, it constitutes the preferred mode of operation. If desired, however, the process can be operated at superatmospheric pressures. The preferred mode of operation is in the liquid phase. The process can, however, be operated also in the vapor phase.

In practicing this invention as a batch operation, a reactor is charged with the conjugated diene and catalyst and, if desired, an organic solvent; the reactor is closed, and heated with agitation to between 30° and 140° C., preferably between 80° and 120° C., for from 50 to 125 hours. Thereafter, the reactor is opened, the reaction product is filtered to remove the catalyst, and the cyclooctadiene is isolated by conventional means, such as vacuum distillation and the like.

The cyclo-1,4-dimerization is usually operated as a bulk operation, that is, in the absence of a solvent. If desired, however, the dimerization can be carried out in the presence of a solvent such as acetic acid, benzene, or any other aliphatic or aromatic hydrocarbon solvent. When a solvent is employed, the amount used is generally equal in weight to the conjugated diene. Amounts outside of these proportions can be used, however, if desired.

The examples which follow are submitted to illustrate and not to limit this invention. Unless otherwise stated, parts are by weight.

Example I

One hundred and fifty (150) parts of 2-chloro-1,3-butadiene is mixed with 3 parts of phenothiazine and 10 parts of an activated carbon, the mixture sealed in a pressure reactor under an atmosphere of nitrogen and heated at 80° C., with agitation, for 120 hours. The dark, mobile product is filtered to remove the charcoal and the small amount of polymer formed and the product is distilled. Twenty-five (25) parts of 2-chloro-1,3-butadiene is recovered and the residue (94 parts) is distilled in vacuo. Three fractions are obtained: (1) B. P. 67–70°/17 mm., 15 parts; (2) B. P. 98–100°/17 mm., 19 parts; and (3) B. P. 115–118°/18 mm., 28.2 parts. Fraction (3) consisting of the eight-membered ring dimer, which is obtained in 30% yield, based on the 2-chloro-1,3-butadiene consumed, is hydrogenated and simultaneously dehydrochlorinated to give a product melting at 9° C. This product is oxidized with nitric acid to a dibasic acid found to be identical to suberic acid. Fractions (1) and (2) are isomeric six-membered ring dimers.

The above experiment is duplicated, except that the activated carbon catalyst is omitted. Under these conditions the yield of eight-membered ring dimer is only 16%.

Example II

A mixture of 400 parts of 1,3-butadiene, 20 parts of an activated carbon, and 10 parts of p-tert.-butylcatechol is heated with agitation in a one-liter reactor at 100° C. for 60 hours. By venting the reactor through a Dry-Ice trap, 203 parts of 1,3-butadiene is recovered. The product is filtered to remove the catalyst. A 25-part portion of the filtrate is hydrogenated with platinum catalyst under 3 atm. hydrogen pressure. The hydrogenated product is filtered to remove the catalyst and examined by means of infrared absorption spectra, and shown thereby to contain approximately 3 to 4% cyclooctane. This indicates that cyclooctadiene was present in the initial product.

The above experiment is duplicated, except that the activated carbon catalyst is omitted. Under these conditions the yield of eight-membered ring dimer is only 0.75%.

Example III

A mixture of 200 parts of 1,3-butadiene, 15 parts of nickel cyanide, 20 parts of calcium oxide (which is included to maintain anhydrous conditions in the reactor), and 4 parts of p-tert.-butylcatechecol is heated at 80° C. for 100 hours. Three percent (3%) of the 1,3-butadiene is converted to a dimer under these conditions (171 parts of the monomer is recovered by venting the reactor through a cold trap). The product is reduced catalytically to the saturated hydrocarbons, which are then examined by means of infrared spectra. The hydrogenated dimeric product is found to contain 48% of cyclooctane.

Example IV

The dimerization of 2,3-dichloro-1,3-butadiene is accomplished by heating 91.3 parts of the monomer, 5 parts of activated carbon and 3 parts of phenothiazine at 80° C. in a sealed reactor for 120 hours. The solid mass is extracted with alcohol, filtered, and the alcohol removed by distillation. The product, preceded by a small foreshot of 3 parts, distills at 140–146°/3.6 mm. (11.3 parts) and subsequently is crystallized as white plates from an alcohol-acetone-water mixture, M. P. 95–97° C.

Anal.—
Calcd. for $C_8H_8Cl_4$: Cl, 57.6; M. W. 246.
Found: Cl, 57.0; M. W., 207; 213; 200; 195.

This compound is shown to possess an eight-membered ring by catalytic reduction to cyclooctane. The yield of eight-membered ring compound, based on the 2,3-dichloro-1,3-butadiene consumed, is 12.4%.

Example V

A mixture of 400 parts of 1,3-butadiene, 8 parts of p-tert.-butylcatechecol and 20 parts of magnesium oxide (powdered, analytical grade) is heated at 110° C. for 50 hours in a rocker-bomb. At the end of this time, 109 parts of butadiene is recovered in a cold trap, and the residue is filtered. The filtrate amounts to 153.3 parts. The product is hydrogenated over a ruthenium catalyst, and the saturated hydrocarbons are distilled. The infrared spectrum of the distillate indicated the presence of 3.5% of the $C_8$-ring compound.

Example VI

A mixture of 40 parts of barium fluoride, 400 parts of 1,3-butadiene and 8 parts of p-tert.-butylcatechol is heated at 100° C. for 35 hours in a rocker-bomb. The product obtained amounts to 194.2 parts. This product is hydrogenated and distilled. Examination of the infrared spectrum of the distillate indicates 1.8% of cyclooctane.

Example VII

A mixture of 200 parts of 1,3-butadiene, 0.5 part of phenothiazine and 20 parts of calcium oxide is heated at 100° C. for 60 hours. The 1,3-butadiene is recovered by distillation and amounts to 126.4 parts. The residue amounts to 87.2 parts. The residue is hydrogenated. The infrared spectrum of the hydrogenation product indicates the presence of 2.1% of cyclooctane.

The nickel cyanide used as a catalyst in the practice of this invention may be obtained either by precipitation from alcoholic solutions of nickel chloride with alcoholic HCN at 0° to 10° C., by precipitation of hydrous nickel cyanide from aqueous solutions of soluble nickel salts at 70° to 80° C. with sodium or potassium cyanide, followed by dehydration of the hydrous nickel cyanide at 150° to 200° C., or by the thermal decomposition of nickel ammonium cyanide. A typical preparation is the following:

In a 30-liter stainless steel-jacketed tank there are placed 18 liters of distilled water and 1963 grams (6.75 moles) of nickel nitrate,

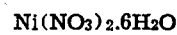

and the mixture heated to 75° C. with stirring. To this solution there is added dropwise, with stirring, a solution of 660 grams of sodium cyanide (13.5 moles) in 6 liters of distilled water, and the resulting slurry maintained at 70° to 80° C. The gelatinous, green precipitate of nickel cyanide which forms is washed free of sodium nitrate by decantation with successive portions of water at 70° to 80° C. The washed precipitate is then filtered and dried at 100° to 110° C. The dry product, after crushing and sizing by screening to suitable granular form, is converted to anhydrous nickel cyanide by heating at 175° C.

Any finely divided calcium or magnesium oxides, cuprous chloride, calcium carbonate, and barium fluoride of good quality can be used in the practice of this invention.

Any of the activated carbons of animal or vegetable origin which are commercially available can be used in the practice of this invention. Typical methods of preparation of such products are those described in U. S. Patents 1,497,543; 1,497,544; and 1,499,908.

The proportion of eight-membered ring compound formed is a function of the temperature, catalyst, and particular aliphatic conjugated diene used. For a given diene, temperature seems to be the most important variable. Satisfactory results are obtained by employing the temperatures and amounts of catalysts herein specified.

The eight-membered carbocyclic compound derived from butadiene is attractive as a polymerizable monomer. The cyclooctadienes of this invention can be converted to suberic acids which are of interest for polyamides, polyesters and the like. The cyclooctadienes carrying chlorine substituents are interesting as insecticides, especially for red spiders. Because of their unsaturation, the cyclooctadienes are attractive for polymer formation. The present invention provides an improved method for producing these attractive eight-membered carbocyclic compounds from aliphatic conjugated dienes.

As many apparently widely different embodiments of this invention may be made without departing from the spirit and scope thereof, it is to be understood that this invention is not limited to the specific embodiments thereof except as defined in the appended claims.

I claim:

1. A process for the dimerization of chloro-1,3-butadienes to chlorocyclooctadienes which comprises heating a chloro-1,3-butadiene at a temperature of 30° to 140° C. in the presence of a polymerization inhibitor and a nickel cyanide catalyst.

2. A process for the dimerization of aliphatic conjugated dienes to cyclooctadienes which comprises heating an aliphatic conjugated diene at a temperature of 30° to 140° C. in the presence of a polymerization inhibitor and a nickel cyanide catalyst.

3. A process for the dimerization of 1,3-butadienes to cyclooctadienes which comprises heating a 1,3-butadiene at a temperature of 30° to 140° C. in the presence of a polymerization inhibitor and a nickel cyanide catalyst.

4. A process for the dimerization of 1,3-butadiene to cyclooctadiene which comprises heating 1,3-butadiene at a temperature of 30° to 140° C. in the presence of a polymerization inhibitor and a nickel cyanide catalyst.

5. A process for the dimerization of 2,3-dichloro-1,3-butadiene to tetrachloro-cyclooctadiene which comprises heating 2,3-dichloro-1,3-butadiene at a temperature of 30° to 140° C. in the presence of a polymerization inhibitor and a nickel cyanide catalyst.

6. A process for the dimerization of 1,3-butadiene to cyclooctadiene which comprises heating 1,3-butadiene at a temperature of 30° to 140° C. in the presence of a phenol as a polymerization inhibitor and a nickel cyanide catalyst.

7. A process for the dimerization of 1,3-butadiene to cyclooctadiene which comprises heating 1,3-butadiene at a temperature of 30° to 140° C. in the presence of p-tert.-butylcatechol as a polymerization inhibitor and a nickel cyanide catalyst.

8. A process for the dimerization of 2,3-dichloro-1,3-butadiene to tetrachloro-cyclooctadiene which comprises heating 2,3-dichloro-1,3-butadiene at a temperature of 30° to 140° C. in the presence of phenothiazine as a polymerization inhibitor and a nickel cyanide catalyst.

9. The tetrachloro-cyclooctadiene obtained by heating 2,3-dichloro-1,3-butadiene at a temperature of 30° to 140° C. in the presence of phenothiazine and a nickel cyanide catalyst.

ROBERT E. FOSTER.

REFERENCES CITED

The following references are of record in the file of this patent:

FOREIGN PATENTS

| Number | Country | Date |
| --- | --- | --- |
| 343,116 | Great Britain | Feb. 16, 1931 |

OTHER REFERENCES

Willstatter et al., Ber., 40, 959–70.
Stafford et al., Can. J. of Research, 6, 209–10 (1932).
J. Am. Chem. Soc., 53, 4211 (1931).
Brown et al., J. Chem. Soc., 101 (1944).